United States Patent [19]

Schillings

[11] 4,236,724
[45] Dec. 2, 1980

[54] STABILIZER FOR TRACTOR HITCH

[75] Inventor: Dieter Schillings, Neuss, Fed. Rep. of Germany

[73] Assignee: International Harvester Company, Chicago, Ill.

[21] Appl. No.: 965,541

[22] Filed: Dec. 1, 1978

[30] Foreign Application Priority Data

Dec. 12, 1977 [DE] Fed. Rep. of Germany ... 7737875[U]

[51] Int. Cl.³ .............................................. B60D 7/00
[52] U.S. Cl. ................................ 280/460 A; 172/450; 280/490 A; 308/238
[58] Field of Search .......... 280/446 A, 456 A, 460 A, 280/461 A, 490 A; 308/238; 172/450

[56] References Cited

U.S. PATENT DOCUMENTS

| 3,056,458 | 10/1962 | Gray | 280/461 A |
|---|---|---|---|
| 3,214,994 | 11/1965 | Tolan | 308/238 |
| 3,302,988 | 2/1967 | Senter | 308/238 |
| 3,310,123 | 3/1967 | Abbott | 280/460 A |
| 3,337,232 | 8/1967 | Pelckii | 280/95 R |
| 3,497,275 | 2/1970 | Hanley | 308/238 |
| 3,535,005 | 10/1970 | Orkin | 308/238 |
| 3,666,335 | 5/1972 | Mundy | 308/238 |
| 3,817,550 | 6/1974 | Young | 280/681 |

Primary Examiner—John P. Silverstrim
Attorney, Agent, or Firm—Ronald C. Kamp; F. David AuBuchon

[57] ABSTRACT

Device for stabilizing the lower links of a three-point hitch conventionally used on farm tractors having a sway bar rotatable connected to the tractor axle by a first pin with its axis paralled to the longitudinal axis of the axle. The other end of the sway bar is connected to one of the lower links by a second pin encased in a rubber metal element and oriented with its axis transverse to the first pin axis.

2 Claims, 4 Drawing Figures

U.S. Patent    Dec. 2, 1980    Sheet 2 of 2    4,236,724
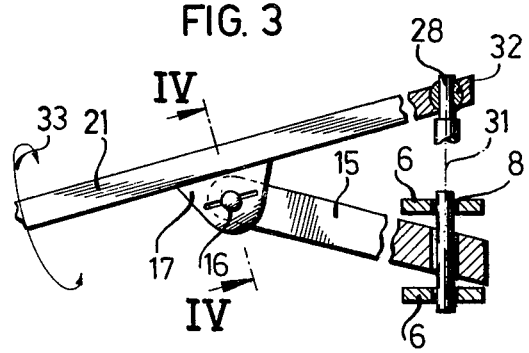
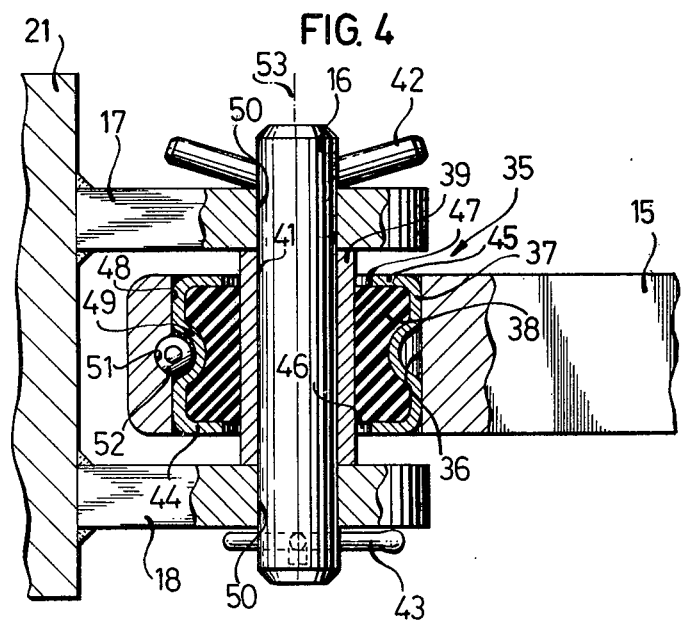

STABILIZER FOR TRACTOR HITCH

The present invention relates to lateral supporting means for the lower links of a three-point hitch on a farm tractor. The lower links are supported by means of spherical members, and the lateral supporting device is designed to prevent or limit the lateral movement of a mounted implement by means of bar-type supporting members which are pivotally connected at their ends to the farm tractor, and to the lower links. The ends of the supporting members are connected to the tractor through two sets of parallel plates provided on the axle housing of a farm tractor.

On conventional lateral supports of this type, each set of plates is provided with bores arranged at different levels. The lower set of bores are arranged to be at the same elevation as the pivot axis of the lower links. If the stabilizers are articulated in the lower bores, depending on the setting of the stabilizers, the lower links are either fixed rigidly, as is required for the operation of most pto-shaft driven implements, or they are capable of full lateral movement over the entire lifting range.

Since the pivot points of the lower links and those of the telescopic stabilizers are arranged in the same plane, the rigid fixation or the full mobility resp. is maintained even with random lifting of the implements.

If, however, the stabilizers are pivoted in the top bores of the plates, the implements (when in operating position) can move freely; however, due to the different positions of the swing axes of both the lower links and the stabilizers, in lifted condition they are fixed rigidly to facilitate a safe transport without any lateral movement.

Due to their mode of being linked to the tractor, the lower links can perform swinging movements in horizontal direction as well as rotating movements in vertical direction. The forces and displacement resulting from the swinging movements, and the displacement resulting from the rotating as well as the combined swinging and rotating movements must be accommodated by the bearing points on the tractor or on the lower links resp. If the stabilizers are linked in the top bores provided on the plates and thus the pivot point of the lower links and the stabilizers' axis of rotation do not coincide, due to the different positions of the axes of rotation at the bearing points, particularly at those between the stabilizers and the lower links, tilting movements develop which generally are absorbed by a double joint and which cause an excessive wear of the bearing points. It is, therefore, an object of this invention to provide a lateral support of the initially mentioned kind which is of an uncomplicated design, which permits free movement in one direction and limited movement in another direction, and which features fewer articulation points and thus contributes to a long service life of the lateral support.

According to the invention this problem is solved by providing the bearing point between the lower links and the stabilizers with a rubber-metal element. With this arrangement the tilting movements are accommodated by the elasticity of the rubber, while the swinging movements are accommodated by the bearing itself.

An expedient design according to the invention comprises a rubber-metal element to having an outer annular sleeve, inserted in a bore provided in the stabilizer, a rubber element arranged therein, and an inner bushing surrounded by said rubber element. This provides a flexible connection which is almost free from play.

It is also of advantage to arrange the sleeve between two plates spaced a distance apart and mounted on the outer side of the lower links, and to provide said sleeve with a traversing cylindrical bore in which a bearing pin is supported which extends through aligned bores provided in the plates. By this arrangement an excellent centering of the bearing itself is achieved and —simultaneously— the elastic absorption of the otherwise deforming force is rendered possible by means of the rubber element.

At its ends projecting beyond the bores provided in the plates the bearing pin can be provided with securing elements, e.g. guide pins or spring pins, used for its axial retention.

In order to minimize end play, the length of the sleeve substantially matches the distance between the plates. By such an arrangement the sleeve is held accurately between the plates and guarantees minimum axial movement of the sleeve.

It is of particular advantage to form the annular sleeve with an inward pointing collar which partly surrounding the rubber element. The rubber element is thereby retained within the annular sleeve. A circular opening is defined by the inward pointing edges of the collar, the diameter of which is slightly larger than the outer diameter of the sleeve. Deformation of the rubber element will then accommodate normal tilting movement, but will be limited by contact between the end collars of the annular sleeve and the inner bushing. An overload safety device for the rubber element is thereby provided.

A preferred embodiment of the invention is shown in the drawing and is explained in detail in the following.

FIG. 3 is a view, partly in section, taken, in the direction of the arrow 'Z' indicated in FIG. 2.

FIG. 4 shows a section along the line IV—IV of FIG. 3.

Figure 1:
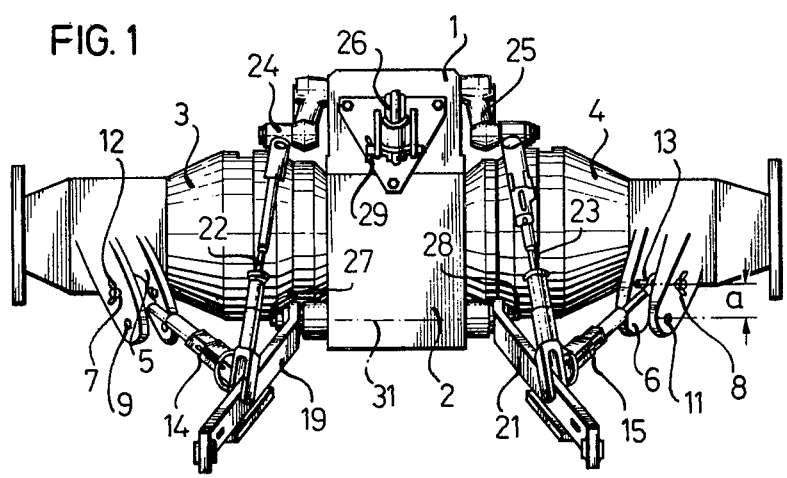
FIG. 1 shows a rear elevation view of a farm tractor equipped with a three-point hitch, the lower links of which are supported by the lateral supporting devices according to the present invention.
Figure 2:
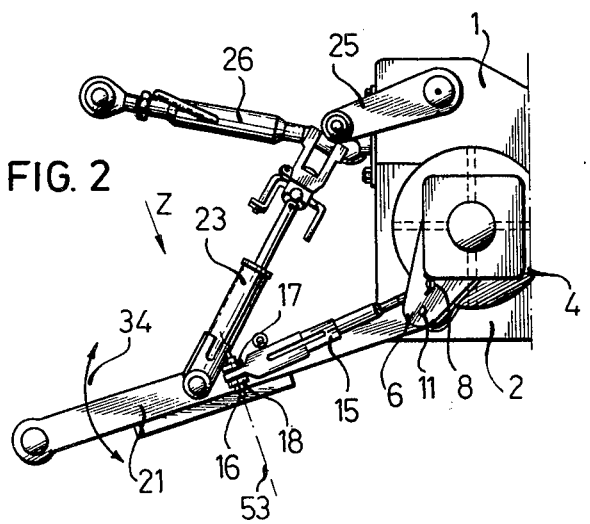
FIG. 2 is an appertaining side view of the device in FIG. 1.

As FIGS. 1 and 2 show, a farm tractor (not shown in detail) features a powerlift housing 1, a transmission housing 2, and the axle housings 3 and 4 arranged laterally thereof.

On the axle housings 3, 4 plate sets 5, 6 are arranged which project in downward direction in an inclined manner and which have been provided with top bores 7, 8 respectively and bottom bores 9, 11 respectively. On the embodiment shown in the FIGS. 1 and 2 articulation pins 12, 13 are inserted in the top bores 7, 8, which serve to establish an articulated connection between the axles housing 3, 4 and 14, 15. The pivot pins 16 (as shown in FIG. 2) serve to connect the other end of the stabilizers 14, 15 between two plates 17, 18 welded onto the outside of the lower links 19, 21 of a three-point linkage. The conventional three-point linkage features lifting rods 22, 23, which are linked to the lift arms 24, 25, of the power lift 1. The three-point linkage furthermore features an upper link 26. Implements (not shown) can be connected to the three-point linkage in a conventional manner. The lower links 19, 21 are linked on the tractor by the insertion of pin ends 27, 28 through the spherical ball members 32. The upper link 26 is also linked to the tractor by means of a pivot pin 29. The axis of pin ends 27, 28 define an axis of rotation 31, which is aligned with the bores 9, 11 provided in the plate sets 5, 6. The top bores 7, 8 provided in the plate sets 5, 6 are arranged at a distance 'a' above the lower bores 9, 11.

FIG. 3 only shows the one lower link 21 with the appertaining stabilizer 15. When in the position shown in FIG. 3, the articulation pin 8 for the stabilizer 15 is supported on the same axis of rotation 31 as the pin end 28.

By the above described articulation of the lower links 19, 21 and the stabilizers 14, 15, both the lower links 19, 21 and the stabilizers 14, 15, can move laterally in direction of the double arrow 33 indicated in FIG. 3, as well as in the vertical plane in the direction of the double arrow 34 drawn in FIG. 2. When moving laterally the lower links 19, 21 perform a rocking movement around the spherical ball member 32, while the stabilizers 14, 15 are pulled along by means of the bearing pins 16. In this case the forces developed by the rocking movements (arrow 33) are accommodated by elastic deformation of the rubber element, in a manner to be more explained hereinafter. If the lower links 19, 21 are moved in vertical direction as indicated by the arrow 34, swinging movements develop in both the lower links 19, 21 and the stabilizers 14, 15. However, these swinging motions have no particular effect, if the stabilizers 14, 15 are linked in the lower bores 9, 11 provided in the plate sets 5, 6, since with this arrangement the axis of rotation of the stabilizers coincide with the axis of rotation 31 of the pin sets 27, 28 for the lower links 19, 21. If, however, the stabilizers 14, 15 are linked in the top bores 7, 8 provided in the plate sets 5, 6, an additional tilting movement develops due to the differing lengths of the turning radii in the bearing points between the lower links 19, 21 and the stabilizers 14, 15. The forces developed by these tilting movements must also be absorbed by the bearing points. The above is achieved by means of a rubber-metal element 35 as shown in detail in FIG. 4. Such a rubber-metal element 35 is provided at each link point between the stabilizer 14, 15 and the lower links 19, 21. FIG. 4 only shows the rubber-metal element 35 arranged in the one stabilizer 15. The rubber-metal element arranged in the other stabilizer 14 is designed completely identical and, therefore, no detailed description is required.

The rubber-metal element 35 consists of an outer annular sleeve 37 arranged in a bore 36 provided in the stabilizer 15. A rubber element 38 is encased by the outer annular sleeve 37 and an inner cylindrical bushing 39. The length of the bushing 39 matches the spacing or distance between the plates 17 and 18 welded onto the lower link 21. A cylindrical bore 41 is provided in the bushing 39 through which a bearing pin 16 is inserted. The ends of pin 16 projecting beyond the plates 17, 18 are provided with bores through which a guide pin 42 and a spring pin 43 are inserted to axially retain the pin 16. The annular sleeve 37 features inward pointing annular collars 44, 45 which define circular openings 46, 47, the diameters of which exceed the outer diameter of the bushing 39. The transitions between the collars 44, 45 and an outer shell 48 of the outer sleeve 37 are of rounded design. Furthermore, an all-round inward drawn torus 49 of semicylindrical cross section is arranged inside the outer shell 48. At an appropriate height of the torus 49 an inclined duct 51 of matching semicylindrical cross section is arranged inside the stabilizer 15. Thus the inclined duct 51 and the torus 49 form a cylindrical duct into which a clamping pin 52 is inserted, by means of which an axial securing of the annular sleeve 37 inside the stabilizer 15 can be effected.

The lateral support (stabilizers) described in subject invention operates as follows:

If the lower links 19, 21 perform lateral rocking movements as indicated by the arrow 33, the stabilizers 14, 15 are moved correspondingly due to the interacting of the pin 16, the bushing 39, and the rubber element 38. If the stabilizers 14, 15 are linked in the top bores 7, 8, and if additional tilting movement is performed, the pin 16 will perform a tilting movement around the pin axis 53, and the bushing 39 will take up an inclined position. The above causes to accommodate this movement and the elastically the rubber element 38 to absorb the forces developed. To prevent any damage to the rubber element 38, the bushing 39 can take up a tilted position only to an extent where its outer circumference either rests against the collar 44 or the collar 45.

What is claimed is:

1. A stabilizer for the lower link of a tractor hitch comprising:
    a stabilizer bar pivotally connected to said tractor;
    a bore in said stabilizer bar;
    an annular sleeve defining inwardly projecting collars inserted in said bore;
    a duct formed adjacent said bore;
    an inwardly drawn torus formed in said sleeve complementary to said duct;
    a clamping pin positioned within and engageable with both said duct and said torus to clamp said sleeve to said stabilizer;
    a cylindrical bushing extending through said sleeve and projecting beyond each side thereof;
    a rubber element carried between and conforming to said sleeve and said bushing;
    a pair of plates attached to said link and spaced apart a distance substantially equal to the length of said bushing; and
    a pin insertable through said plates and said bushing to effect an articulation and pivotal connection between said link and said stabilizer bar.

2. In a stabilizer according to claim 1, wherein said inwardly projecting collars are spaced from said cylindrical bushing so that contact therebetween serves to limit their relative angular displacement.

* * * * *